(12) United States Patent
Jokinen

(10) Patent No.: US 9,047,744 B2
(45) Date of Patent: Jun. 2, 2015

(54) STRAP FOR PORTABLE DEVICE WITH LIGHT INDICATOR

(75) Inventor: Teppo Tapani Jokinen, Espoo (FI)

(73) Assignee: Nokia Corporation, Espoo (FI)

( * ) Notice: Subject to any disclaimer, the term of this patent is extended or adjusted under 35 U.S.C. 154(b) by 535 days.

(21) Appl. No.: 12/722,724

(22) Filed: Mar. 12, 2010

(65) Prior Publication Data

US 2011/0223977 A1 Sep. 15, 2011

(51) Int. Cl.
*H04M 1/02* (2006.01)
*G08B 5/36* (2006.01)
*H04M 1/04* (2006.01)
*H04M 1/22* (2006.01)

(52) U.S. Cl.
CPC .. *G08B 5/36* (2013.01); *H04M 1/04* (2013.01); *H04M 1/22* (2013.01)

(58) Field of Classification Search
USPC ......... 455/550.1, 575, 1, 90.1, 347, 351, 567, 455/571.2, 571.3; 362/108
See application file for complete search history.

(56) References Cited

U.S. PATENT DOCUMENTS

| 5,475,574 A | 12/1995 | Chien ........................... 362/108 |
| 7,180,265 B2 | 2/2007 | Naskali et al. ................ 320/108 |
| 2004/0232179 A1 | 11/2004 | Chauhan ...................... 224/257 |

FOREIGN PATENT DOCUMENTS

| DE | 20 2004 018 030 U1 | 1/2005 |
| GB | 2 350 053 A | 11/2000 |
| JP | 2002027061 A | 1/2002 |
| WO | WO 2004/070961 A1 | 8/2004 |

OTHER PUBLICATIONS

Strapya World: Glow in the dark! Luminous Loop Cell Phone Strap, Strapya Next Co. Ltd, http://www.strapya-world.com/products/20079.html, downloaded from the internet Feb. 19, 2010.

*Primary Examiner* — Thanh Le
(74) *Attorney, Agent, or Firm* — Harrington & Smith

(57) ABSTRACT

An apparatus including a flexible strap section configured to emit visible light; and a connection section configured to connect the flexible strap section to a portable electronic device such that the portable electronic device can hang from the flexible strap section. The connection section is configured to receive a signal from the portable electronic device. The flexible strap section is configured to emit the visible light based, at least partially, upon the signal from the portable electronic device.

17 Claims, 8 Drawing Sheets

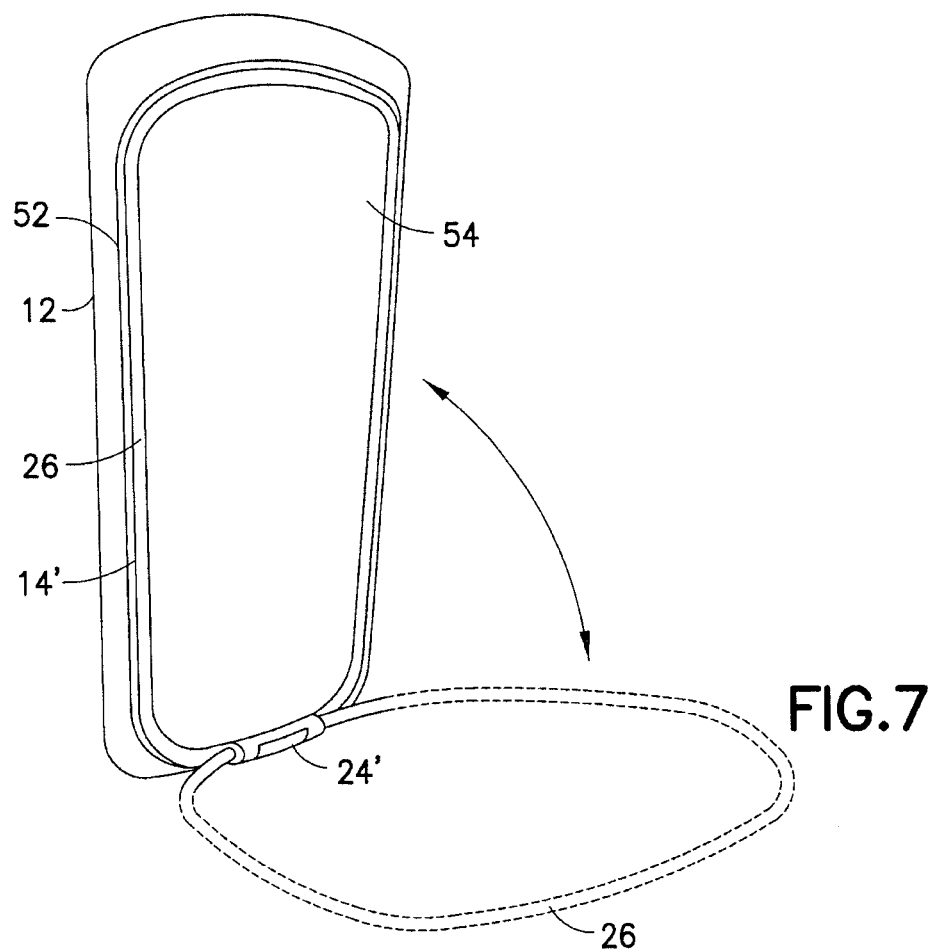
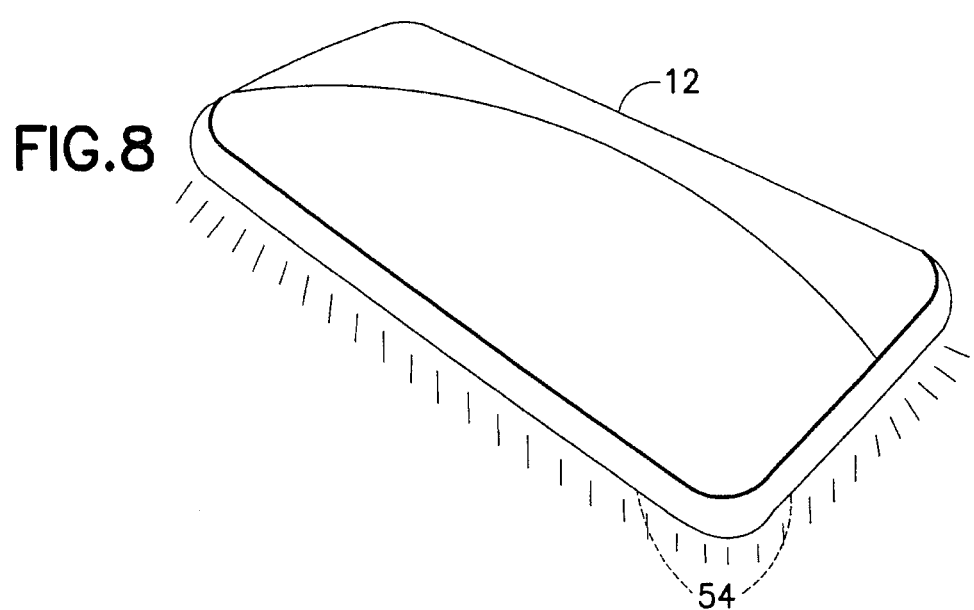

STRAP FOR PORTABLE DEVICE WITH LIGHT INDICATOR

BACKGROUND OF THE INVENTION

1. Field of the Invention

The invention relates to a portable electronic device and, more particularly, to a carry strap for carrying the portable electronic device.

2. Brief Description of Prior Developments

Portable electronic devices, such as a mobile phone or a hand-held game or game component for example, can be provided with wrist straps or neck straps. Such portable electronic devices can also be connected to other devices, such as a personal computer for example, by an electrical cable to transfer data. Data can also be transferred wirelessly. It is also know to signal a user from a telephone of an event, such as by sound or vibrating. For example the event could be a missed call or a received text message. An incoming call can also be signaled by lighting a display on the telephone.

SUMMARY

The following summary is merely intended to be exemplary. The summary is not intended to limit the scope of the claimed invention.

In accordance with one aspect of the invention, an apparatus is provided including a flexible strap section configured to emit visible light; and a connection section configured to connect the flexible strap section to a portable electronic device such that the portable electronic device can hang from the flexible strap section. The connection section is configured to receive a signal from the portable electronic device. The flexible strap section is configured to emit the visible light based, at least partially, upon the signal from the portable electronic device.

In accordance with another aspect of the invention, an apparatus is provided comprising a portable electronic device; and a carry strap connected to the portable electronic device. The carry strap is configured to allow the portable electronic device to hang therefrom. The carry strap comprises a flexible strap section configured to emit visible light, wherein the flexible strap section comprises a signal conductor; and a signal connector connected to a first end of the signal conductor. The signal connector is directly connected to the portable electronic device by a removable connection. A second end of the signal conductor is connected to circuitry of the portable electronic device. The signal conductor is configured to transmit signals between the signal connector and the circuitry.

In accordance with another aspect of the invention, a method is provided comprising providing a portable hand-held electronic device with a support strap adapted to emit visible light; and controlling emission of the light from the support strap based, at least partially, upon transmission of data to or from the portable hand-held electronic device.

In accordance with another aspect of the invention, a program storage device readable by a machine, tangibly embodying a program of instructions executable by the machine for performing operations is provided, at least one of the operations comprising controlling emission of visible light from a support strap connected to a portable hand-held electronic device based upon transmission of data to or from the portable hand-held electronic device, wherein the support strap is configured to allow the portable hand-held electronic device to hang therefrom.

BRIEF DESCRIPTION OF THE DRAWINGS

The foregoing aspects and other features of the invention are explained in the following description, taken in connection with the accompanying drawings, wherein:

FIG. 7 is a perspective view illustrating another embodiment of the invention;

FIG. 8 is a perspective view of the apparatus shown in FIG. 7 with its rear side down, located on a support surface, and showing the glow reflection provided by illumination of the carry strap;

DETAILED DESCRIPTION OF EMBODIMENTS

Figure 1:
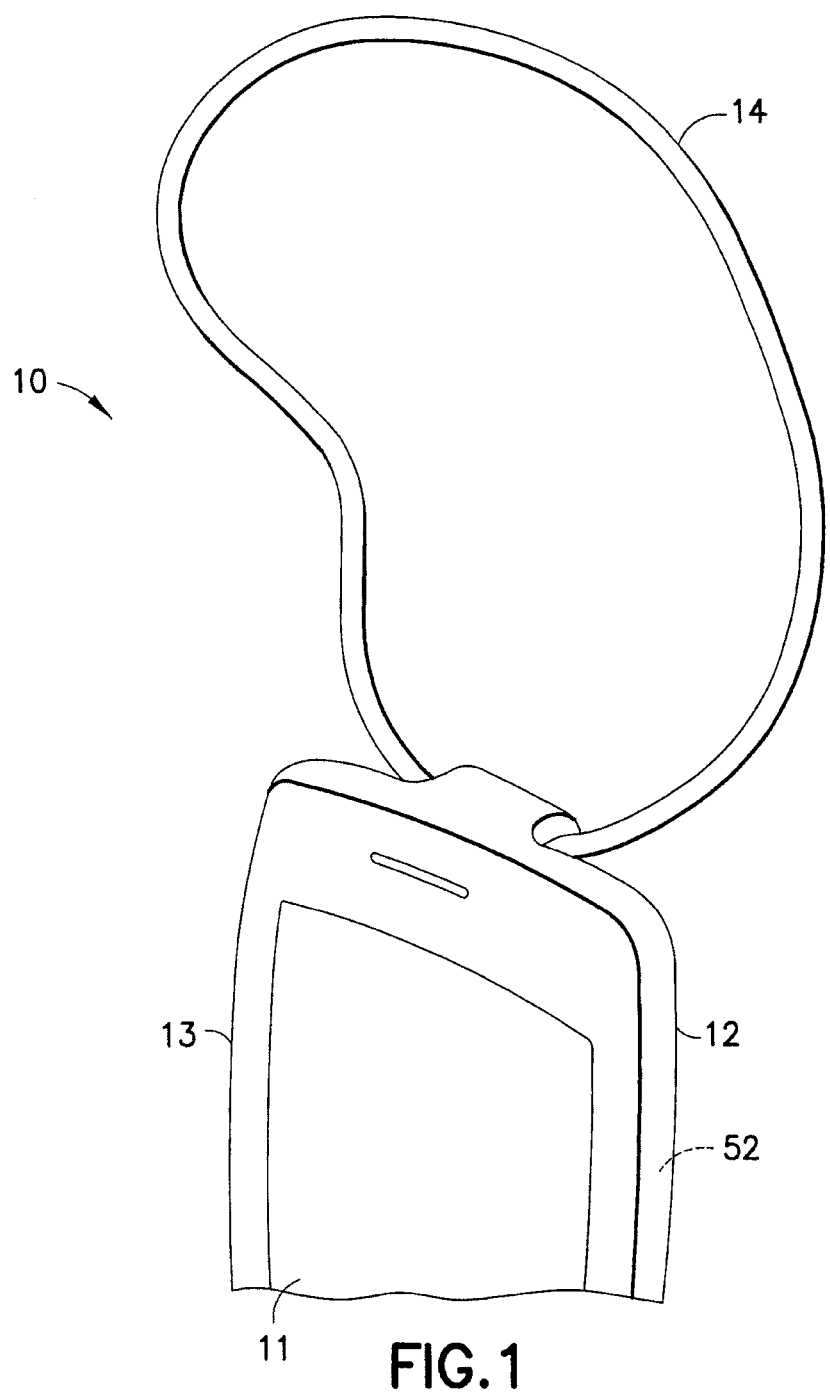
FIG. 1 is a partial perspective view of an apparatus comprising features of the invention.

Referring to FIG. 1, there is shown a partial perspective view of an apparatus 10 incorporating features of the invention. Although the invention will be described with reference to the example embodiments shown in the drawings, it should be understood that the invention can be embodied in many alternate forms of embodiments. In addition, any suitable size, shape or type of elements or materials could be used.

The apparatus 10 comprises a portable electronic device 12. In particular, in this example embodiment the portable electronic device 12 is a hand-held mobile phone. However, in alternate embodiments the device could be any suitable type of portable electronic device, such as a camera, or an electronic game or game component for example. In addition to the device 12, the apparatus 10 comprises a carry apparatus or carry strap 14.

Figure 2:
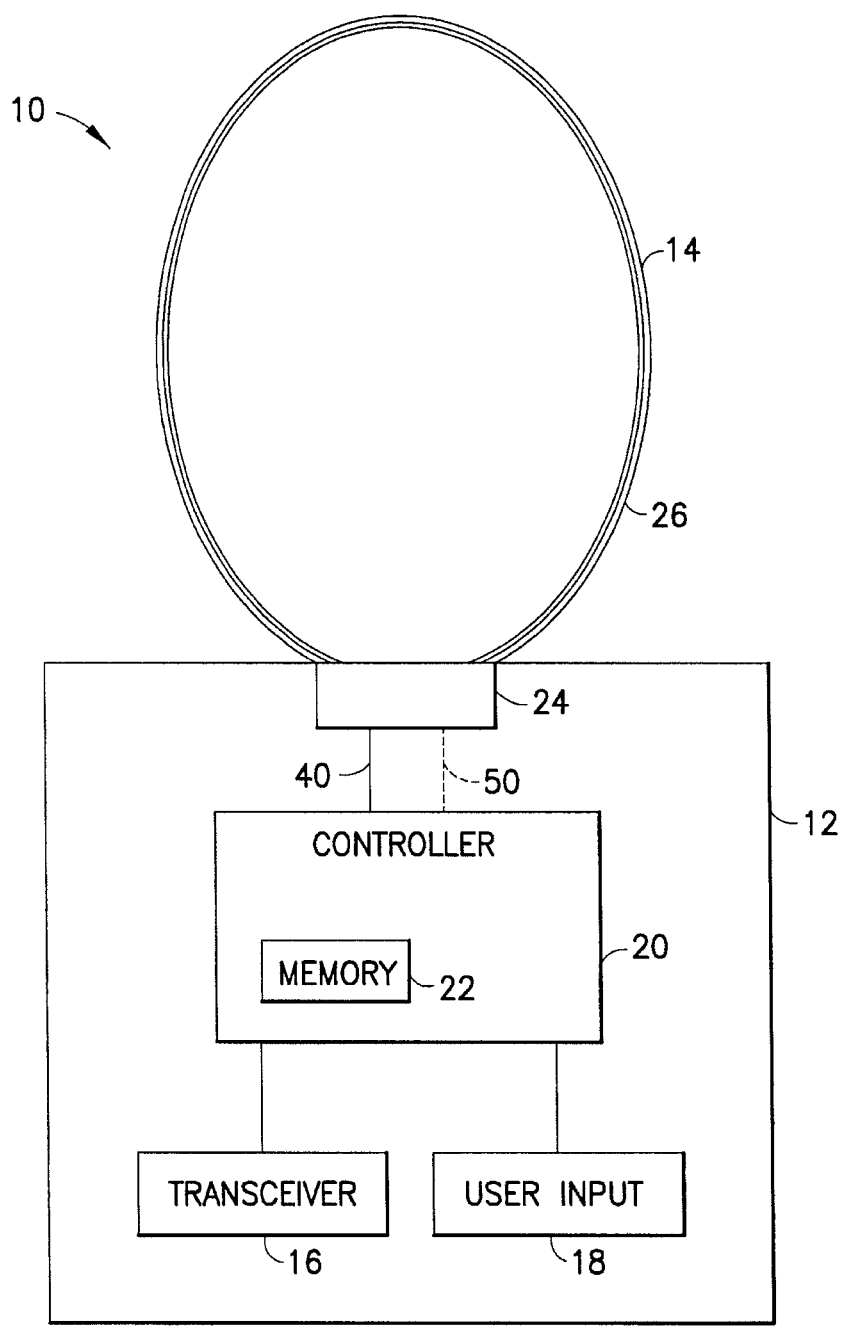
FIG. 2 is a schematic view of components of the apparatus shown in FIG. 1.
Figure 3:
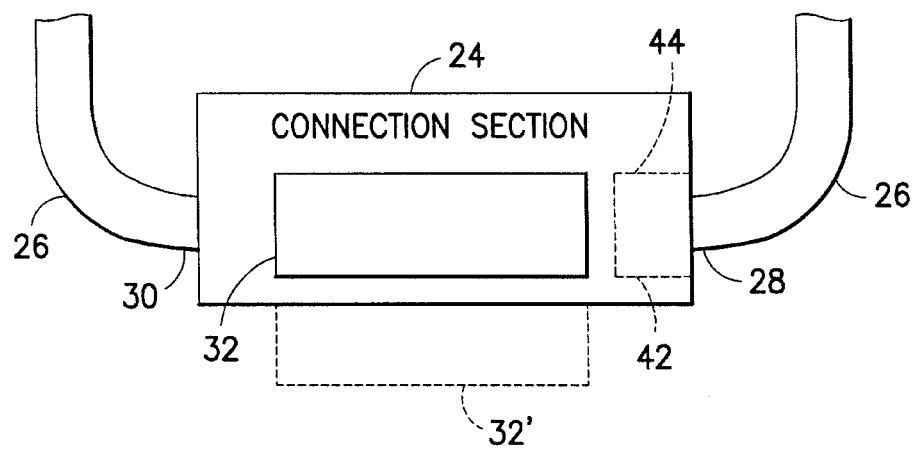
FIG. 3 is a diagram illustrating a connection of the carry apparatus shown in FIG. 1.

Referring also to FIG. 2, the phone 12 includes the a transceiver 16, a user input 18, a display 11 (see FIG. 1), and a controller 20. The display could include the user input 18 such as a touch screen for example. The controller 20 comprises a memory 22 and could include a microprocessor for example. Referring also to FIG. 3, the carry apparatus 14 includes a connection section 24 and a flexible strap section 26. The connection section 24 provides a mechanical connection of the flexible strap section 26 to the phone 12. The flexible strap section 26 has a first end 28 and an opposite second end 30. The two ends 28, 30 are connected to the connection section 24 to form a general loop shape. The carry apparatus 14 forms a carry strap for supporting the phone 12, such as hanging the phone on a wrist of a user for example. This provides security when holding the phone so the user does not drop it accidentally.

In this example embodiment the connection section 24 comprises an energy source 32. The energy source 32 is a source of radiant energy, such as one or more Light Emitting Diodes (LEDs) for example. In one type of embodiment the energy source can comprise different color LEDs, such as three different color LEDs for example. In one type of alternate embodiment the energy source could be located in the phone 12 as indicated by 32' in FIG. 3 and 32 could be an optical component(s) to direct light from the energy source 32' into the strap section 26.

Figure 4:
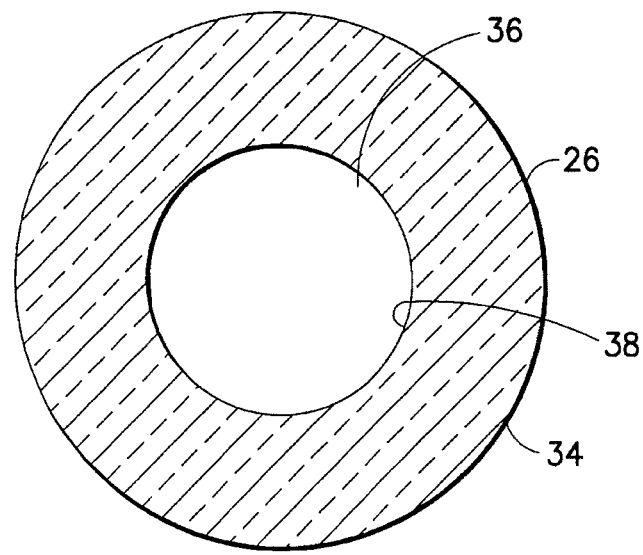
FIG. 4 is a schematic cross sectional view of the flexible strap section of the carry strap shown in FIGS. 1-3.

Referring also to FIG. 4, the strap section 26 comprises a flexible tube 34 preferably comprises of transparent or substantially transparent plastic or polymer material. The tube 34 has an inner channel 36. This inner channel 36 can have different constructions in different embodiments. In one type of embodiment the inner channel 36 is a light guide, such as a fiber optic bundle for example. In another type of embodiment the inner channel 36 comprises luminescent material, such as fluorescent material or phosphorescent material for example. The luminescent material could be ink sprayed onto an inner surface 38 of the flexible tube 34. In another alternate embodiment, any suitable light conducting material, which still allows the tube 34 to bend and flex could be provided. The design, however, is to allow the strap section 26 to function as a light tube to allow visible light to radiate or emit along the longitudinal length of the strap section 26; powered by the energy source 32 (or 32').

The energy source 32 is connected to the controller 20 as indicated by line 40 in FIG. 2. The controller 20 is configured, such as with software or programming in the memory 22 for example, to control the energy source 32. In the simplest embodiment the energy source 32 has only one LED which the controller 20 merely turns ON and OFF based upon a predetermined event. A predetermined event could be, for example, occurrence of an incoming telephone call, or an incoming Short Message Service (SMS), or an incoming text message, or an incoming instant message, or a missed telephone call, or a predetermined data transmission event to or from the portable electronic device, or a reminder, or an alarm. These are only some examples and should not be considered as limiting. When the LED is illuminated, light can travel from the LED into one or both of the ends 28, 30 of the strap section 26 and radiate outward from the tube 34 along the length of the tube 34. This can provide a decorative feature for the phone. It can also provide a functional visual signaling feature of the phone; to signal occurrence of the predetermined event. The illuminated strap can be used to help a user find a phone quickly, such as at night or in a handbag for example.

The device 12 can be configured to allow the user to personalize when and how light is emitted from the strap 14. For example, with multiple different color LEDs, the user could program the phone 12 such that an incoming call from a first person would cause the strap to show a red color, and an incoming call from a second different person would cause the strap 14 to show a green color. Thus, the user could identify calls from different people based upon the color emitted from the carry strap 14. Another way predetermined events or user personalization or customization could be provided (as an alternative to color or in addition to color) could be the intensity of the light emitted from the strap 14. For example, a first type of event might have only one LED energized. However, a second different type of event might have two of the LEDs in the radiant energy source 34 energized. A third type of event might have three or more LEDs energized. Another way predetermined events or user personalization or customization could be provided (as an alternative to color and intensity, or in addition to color and intensity) could be pattern or frequency of illumination emanating from the carry strap 14. For example, a first type of event might have a slow and steady blinking effect, but a second different type of event might have a very fast blinking effect (perhaps to indicate a high priority event, such as a call from a child or from work). Thus, light messaging could be provided. Various visible light signaling techniques would be used or combined, and one or more could be user configurable.

Figure 5:
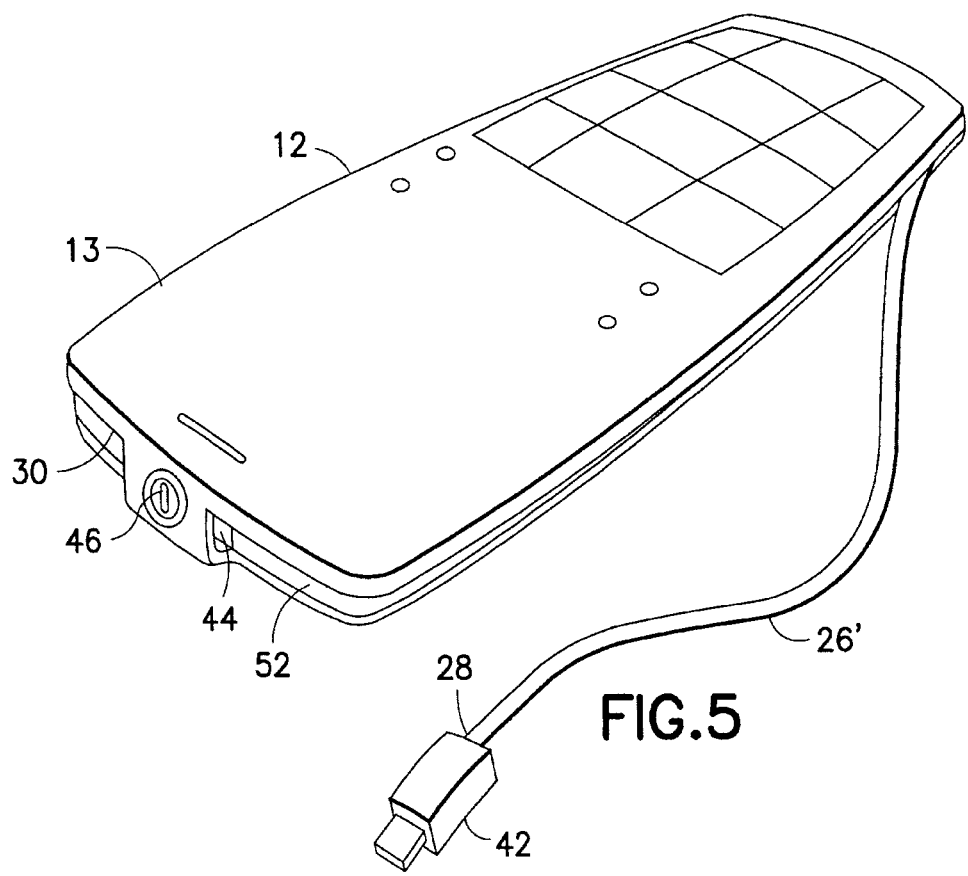
FIG. 5 is a perspective view illustrating an alternate embodiment of the invention.

In the embodiment shown in FIGS. 1-3, the two ends 28, 30 of the strap 14 are fixedly connected to the connection section 24. Referring also to FIG. 5, the apparatus can comprise an additional feature integrated into the carry apparatus 14. In particular, the carry apparatus 14 can function as an electrical cable for connecting the apparatus 10 to another device, such as a personal computer or battery charger (not shown) for example. In this embodiment the first end 28 of the strap section 26 has an electrical connector 42. The electrical connector 42 is removably located in a socket 44 of the connection section 24 (see also FIG. 3). When the electrical connector 42 is located in the socket 44, it is prevented from being inadvertently removed from the socket unless a user presses a release button 46. Thus, when the electrical connector 42 is located in the socket 44, the strap section 26 has both ends 28, 30 connected to the device 12 to be able to function as a loop carry strap. However, the user can detach the electrical connector 42 from the socket 44 and connect it to another device.

Figure 6:
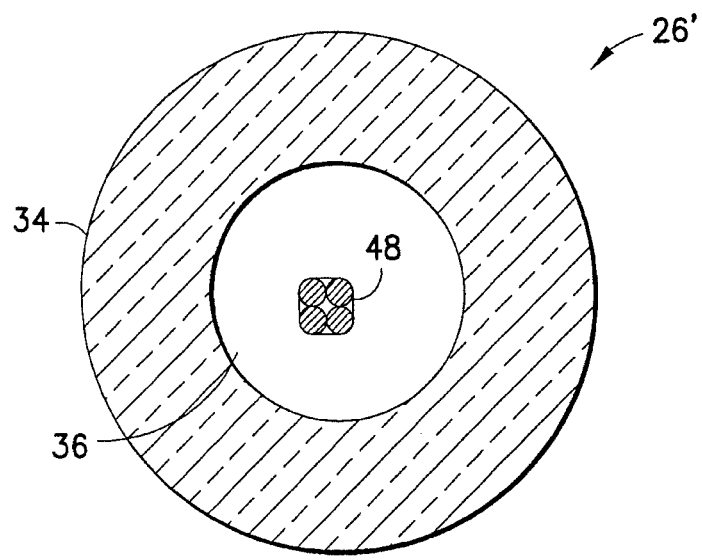
FIG. 6 is a schematic cross sectional view of the flexible strap section of the carry strap shown in FIG. 5.

In one embodiment of the invention, the electrical connector 42 is a Universal Serial Bus (USB) connector which can be plugged into a USB port of a personal computer. However, any suitable electrical connector could be provided. Referring also to FIG. 6, in this embodiment the flexible strap section 26' has the tube 34, light conducting channel 36 and electrical conductors 48. The conductors 48 connect the electrical connector 42 to circuitry of the device 12 as illustrated by line 50 in FIG. 2. Thus, in one embodiment of the invention, the carry apparatus 14 can have three or more functions including a mechanical carry strap function, a visual lighting function (decorative and/or signaling), and a data and/or power conductor function. In this embodiment, a user can download content from another device, such as a personal computer for example, to the phone by a direct wired connection via the strap which functions as a USB cable, and can even be used to charge the phone.

In one method of the invention, when connected to another device by the electrical connector 42 (or perhaps even wirelessly), the device 12 could be programmed to have light emanate from the strap 14 during data transmission, or perhaps at the conclusion of data transmission. Thus, a method can be provided comprising providing a portable hand-held electronic device 12 with a support strap 14 adapted to emit visible light; and controlling emission of the light from the support strap based, at least partially, upon transmission of data to or from the portable hand-held electronic device 12. A program storage device such as memory 22 or another memory or CD-ROM for example can be provided readable by a machine, tangibly embodying a program of instructions executable by the machine for performing operations, at least one of the operations comprising controlling emission of visible light from a support strap connected to a portable hand-held electronic device based upon transmission of data to or from the portable hand-held electronic device, wherein the support strap is configured to allow the portable hand-held electronic device to hang therefrom.

In one example embodiment, the controller can be configured such that the light emission indicates an amount of data. For example, a first color could indicate a very large data file size to be transferred to or from the device and a second color could indicate a smaller data file size. In another example embodiment, the controller could be programmed such that, after a user has started a download, the light emission from the carry strap could also indicate or signal how much data is left to be downloaded. For example, a red color emitted from the carry strap could be provided during the first half of the download, and a white color emitted from the carry strap could be provided during the second half of the download. Additionally or alternatively, a rate of blinking of the light emitted from the carry strap could changing based upon an amount of data downloaded versus still needing to be downloaded. For example, a steady light could be provided during the first third of the download, a first slow blinking rate could be provided during the second third of the download, and a second faster blinking rate could be provided during the last third of the download. These are only examples and should not be considered as limiting the invention.

This could also be used to signal a rate of data transmission to or from the device (such as a fast rate of transmission versus a slower rate of transmission). This could also be used to signal strength of a wireless connection with a base station. For example, a red light could signal poor signal strength (similar to the situation of having only "one bar" signal strength connection) and a white light could signal an excellent signal strength (similar to the situation of having a "five bar" signal strength connection). A feature of the invention can comprise visualizing information relating to a data transfer, while the user is downloading context, as light emitted from the carry strap. Based upon the visible light emitted from the carry strap, the user could know the size of a file and the speed of transfer (or any other data transfer quality or quantity), and the light emitted from the carry strap could indicated when the data transfer is done. The user does not need to read the display 11. This might be particularly advantageous for people with sight impairment, or in situations were looking at the display 11 is difficult (such as at night), or when the user wants an immediate indication of completion of the download without having to continuously read the display 11.

As seen in FIGS. 1 and 3, the housing 13 of the device 12 includes a storage area 52 for the flexible strap section 26, 26'. However, in an alternate embodiments a storage area for the flexible strap section might not be provided. In these embodiments the storage area 52 generally wraps around the outer perimeter of the housing 13 in a general loop configuration. The storage area 52 forms a groove which the flexible strap section 26, 26' can be fixedly held in and removed from. This provides a convenient storage area for the flexible strap section 26, 26' when not in use. When the flexible strap section 26, 26' is located in the storage area 52, and the strap section is illuminated, it can also provide a unique visual presentation as described in further detail in regard to the next embodiment.

Referring now to FIGS. 7-8, an embodiment is shown wherein the flexible strap section 26 of the carry strap 14' is connected by a rotatable connection section 24' which is rotatably connected to the housing 13 between a storage position in the storage area 52 and a deployed position out of the storage area 52. As seen in FIG. 8, when the flexible strap section 26 is in the storage position in the storage area 52, the back side 54 of the apparatus can be placed on a support surface (such as a table top for example) and, when the flexible strap section 26 is illuminated, a bottom facing perimeter glow is provided by light reflecting off of the support surface. This can provide a new fashion decorative type of visible light signaling to the user. The visual effect is a floating light effect under the apparatus. The attachment of the connection section 24' to the housing 13 is user removable such that different color or color pattern flexible strap sections 26 can be selected or changed by the end user for customization of their phone. Locating and dislocating the flexible strap section 26 relative to the storage area 52 can comprise a snap-lock engagement wherein the flexible strap section 26 can resiliently deform to be snapped into the storage area 52 and resiliently deform to be snapped out of the storage area 52.

Figure 9:
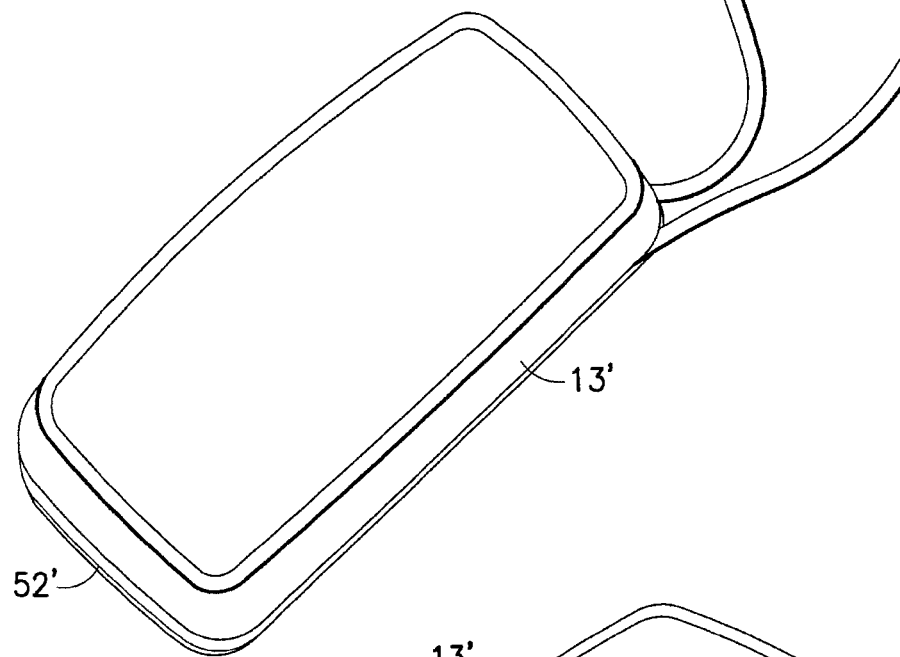
FIG. 9 is a perspective view illustrating another embodiment of the invention.
Figure 10:
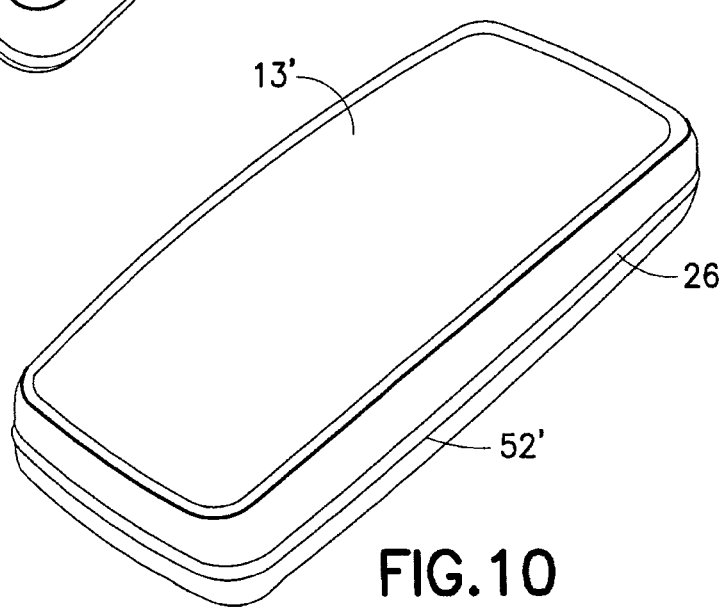
FIG. 10 is a perspective view as in FIG. 9 but with the carry strap in a storage location.

Referring also to FIGS. 9-10, another embodiment is shown wherein the flexible strap section 26 has opposite ends 28, 30 connected to a corner of the housing 13'. The housing 13' includes a storage area 52' located around the side perimeter of the housing. FIG. 10 shows the flexible strap section 26 stored in the storage area 52', and FIG. 9 shows the flexible strap section 26 deployed from the storage area 52'. With this embodiment the strap section 26 surrounds the housing 13' to provide a bumper for the device. Thus, if the device is accidentally dropped, the strap section 26 can protect the device because the strap section 26 is resiliently deflectable. This location of the strap section 26 around the housing of the device can have any suitable pattern or layout around the housing when in its storage location, and does not need to have opposite ends 28, 30 connected to a corner of the housing.

Figure 12:
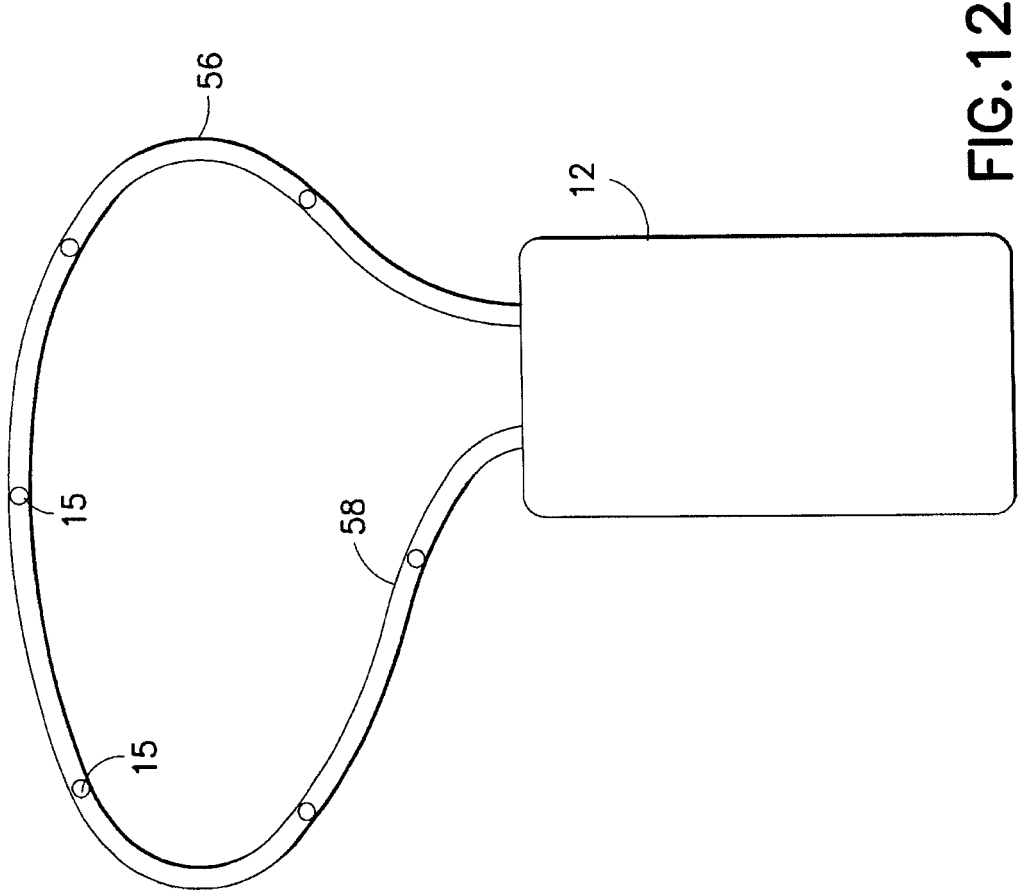
FIG. 12 is a front view of another embodiment of the invention.
Figure 11:
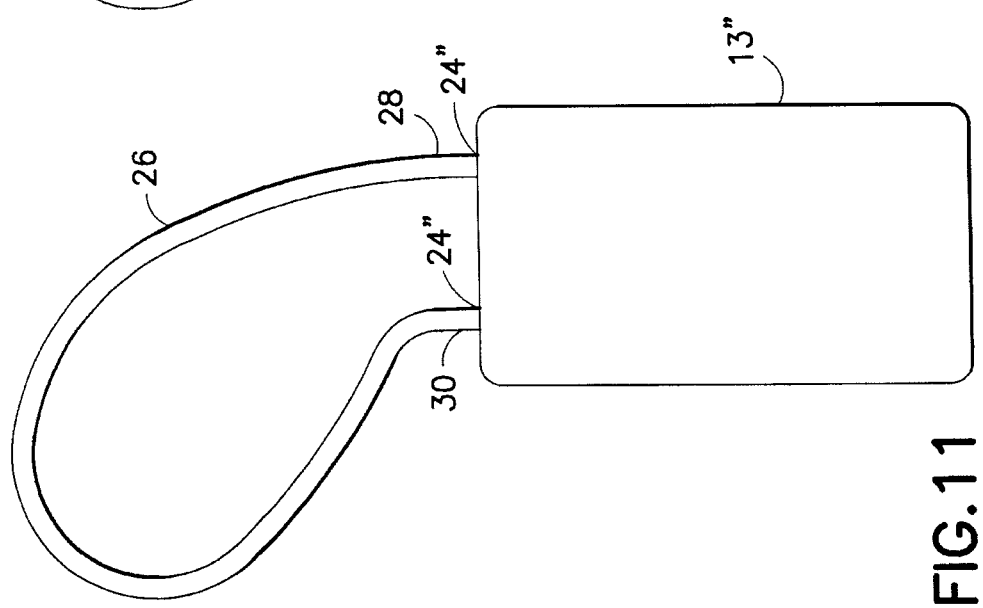
FIG. 11 is a front view of another embodiment of the invention.

Referring also to FIG. 11, another embodiment is shown wherein the flexible strap section 26 has opposite ends 28, 30 connected to the housing 13" by two connection sections 24" spaced from each other. Referring also to FIG. 12, another embodiment is shown wherein, rather than a light guide, the flexible strap section 56 has multiple LEDs 58 along its longitudinal length. In another alternate embodiment the strap section could comprise a light guide and one or more LEDs, and/or multiple discreet light guides.

In one example of the invention an apparatus is provided comprising a flexible strap section 26, 26', 56 configured to emit visible light; and a connection section 24, 24', 24" configured to connect the flexible strap section to a portable electronic device 12 such that the portable electronic device can hang from the flexible strap section. The connection section is configured to receive a signal from the portable electronic device, and the flexible strap section is configured to emit the visible light based, at least partially, upon the signal from the portable electronic device. The flexible strap section can comprise a longitudinal flexible light guide. The signal can be an optical signal and the connection section can comprise an input into the flexible light guide. The flexible strap section can comprise a substantially transparent flexible tube around the light guide. The connection section can comprise a Light Emitting Diode (LED) configured to emit the visible light into the light guide, and wherein the signal is an electrical signal provided to the Light Emitting Diode (LED). The flexible strap section can comprise a linear array of Light Emitting Diodes (LEDs). The flexible strap section can have a general loop shape with opposite ends connected to the connection section. The flexible strap section can comprise an electrical conductor connected to an electrical connector at a first end of the flexible strap section, wherein the connection section is located at a second end of the flexible strap section. The electrical connector can comprise a Universal Serial Bus (USB) electrical connector. The flexible strap section can comprise an electrical conductor, wherein the apparatus is configured to both emit the visible light along a length of the flexible strap section and conduct electricity along the length of the flexible strap section. The flexible strap section can comprises luminescent material. The connection section can be configured to provide radiant energy to the luminescent material. The connection section can comprise a first section configured to user detachably connect a first end of the flexible strap section to the portable electronic device, and an opposite second section configured to fixedly connect a second end of the flexible strap section to the portable electronic device. A controller of the portable electronic device can be configured to allow different colors, or light intensities, or patterns of illumination to occur at the flexible strap section. The controller can be configured to allow a user to select different colors, or light intensities, or patterns of illumination to occur at the flexible strap section for different predetermined events.

With the invention, an apparatus can be provided comprising a portable electronic device; and a carry strap connected to the portable electronic device, wherein the carry strap is configured to allow the portable electronic device to hang therefrom, wherein the carry strap comprises a flexible strap section configured to emit visible light, wherein the flexible strap section comprises a signal conductor; and a signal connector connected to a first end of the signal conductor, wherein the signal connector is directly connected to the portable electronic device by a removable connection. A second end of the signal conductor is connected to circuitry of the portable electronic device, and wherein the signal conductor is configured to transmit signals between the signal connector and the circuitry. The portable electronic device can comprise a transceiver and a controller, and wherein the controller is configured to cause the flexible strap section to emit the visible light based upon occurrence of an incoming telephone call, or an incoming Short Message Service (SMS), or an incoming text message, or an incoming instant message, or a missed telephone call, or a predetermined data transmission event to or from the portable electronic device. The portable electronic device can comprise a controller configured to cause the flexible strap section to emit the visible light or cause the flexible strap section to stop emitting the visible light based upon a predetermined event. The controller can be configured to allow different colors, or light intensities, or patterns of illumination to occur at the flexible strap section. The controller can be configured to allow a user to select different colors, or light intensities, or patterns of illumination to occur at the flexible strap section for different predetermined events, such as by the user inputting settings into the user input 18 for example.

In one method of the invention, software programs or mobile phone applications could be downloaded, such as being purchased by the user of the phone to provide a pattern of illumination to synchronize with a ring tone of a song or other music for example. Thus, synchronization data could be sold to the user by a supplier. The synchronization data could be downloaded into the apparatus 12 at the same time the ring tone or other music is downloaded. Alternatively, the synchronization data could be downloaded into the apparatus 12 at a later time after the ring tone or other music is downloaded. The synchronization data could be used to signal a beat of the music for example. The synchronization could be different colors for different tones or notes or melodies (music mood lighting that changes in intensity and color etc. in accordance with the music being played, or a type of disco lighting from the strap during playing of disco music for example).

Figure 13:
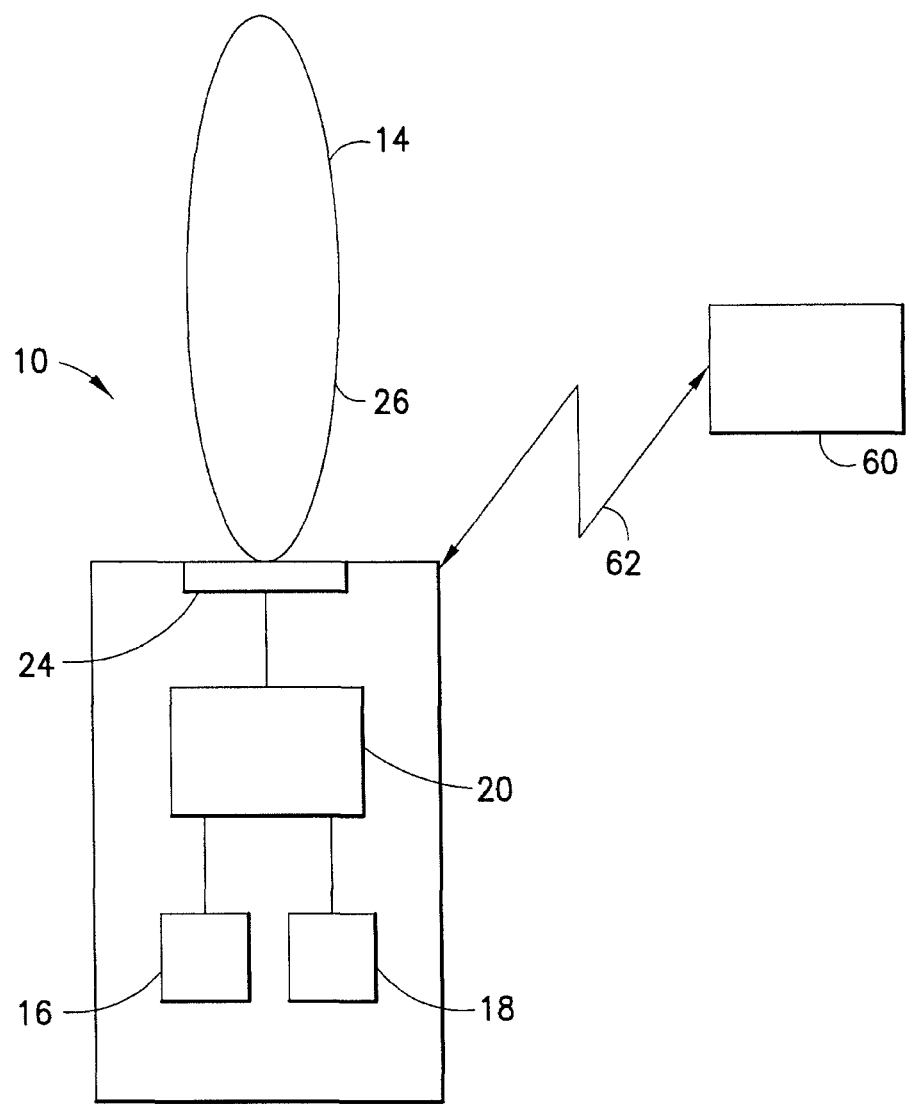
FIG. 13 is a schematic diagram illustrating one use of the apparatus shown in FIG. 1 with a separate device.

Referring also to FIG. 13, the apparatus 10 could be used with a separate device 60, such as an accessory device, to provide feedback or other information to the user. In this example embodiment shown, the accessory device 60 is connected to the apparatus 10 by a wireless link 62, such as a BLUETOOTH connection for example. The accessory device 60 could be a heart rate monitor for example. The controller 20 could be programmed or have an application to cause the carry strap 14 to output a specific color or pattern of color(s) based, at least partially, upon a heart rate signal from the accessory device 60 sent via the wireless link 62. For example, if a user's heart rate is less than 100 beats per minute the controller 20 could cause the strap section to have a white color. If the heart rate was between 100-180 beats per minute, the controller 20 could cause the strap section to have a green color. If the heart rate was over 180 beats per minute, the controller 20 could cause the strap section to have a red color. The apparatus 10 could be programmed or otherwise configured to cause pulsing of light from the strap section 26 in substantial synchronization with the user's heart rate for example. Thus, the flashing light from the strap section could signal the beat of the user's heart rate and rhythm. This could give a benefit to a user such as when running for example. It could give an emotional boost or training boost to a user by being able to determine a heart rate visually from a telephone strap during exercise. It could indicate a pace of the runner and/or if the runner was exerting himself/herself too much relative to a desired or predetermined rate. This could be used in conjunction with GPS determined location and speed of the user based upon GPS circuitry in the apparatus 10 and mapping data or a map/location application in the apparatus 10. This is only an example of how the carry strap could be used to output a signal to the user regarding exercise, and perhaps wellness. The apparatus could be used to monitor a user's bio data and translate that data into a visual form via the strap.

Of course, the apparatus 10 might not be the user's apparatus. In a medical application for example, the apparatus 10 might be a home healthcare worker's phone and the accessory might be on a patient. The link could be through a telephone system and the transceiver 16, and the strap 26 might illuminate only after a predetermined excessive heart rate or low heart rate of the patient was sensed by the accessory 60.

As another example of use of apparatus for an additional signaling purpose, the controller 20 could be programmed with a well-being application or software program which could allow a user to input wellness information such as food calorie information for example. The software could be programmed to remain at a certain color until after a predetermined amount of time elapsed after eating a certain amount of calories. For example, the strap section 26 could turn from white to red after a user input calories (or an equivalent entry) of a banana just eaten, and the controller could be programmed to turn from red to white after 40 minutes. The user would then interpret this as being a signal that the caloric intake from the banana was probably burned up by his or her body, and the user could then eat again. As a similar example, the strap section 26 could turn from white to red after a user input calories (or an equivalent entry) of a hamburger just eaten, and the controller could be programmed to turn from red to white after two hours. The user would then interpret this as being a signal that the caloric intake from the hamburger was probably burned up by his or her body, and the user could then eat again. The controller 20 could be programmed or have applications for monitoring and tracking a range of everyday well-being parameters, such as weight, eating habits, exercise, blood pressure, and others. Because this health journal resides on a personal mobile device, the user will have privacy and ease of speedy use in everyday situations, as well as the convenience of mobile data, readily available to be shared with a physician or a personal trainer.

It should be understood that the foregoing description is only illustrative of the invention. Various alternatives and modifications can be devised by those skilled in the art without departing from the invention. For example, features recited in the various dependent claims could be combined with each other in any suitable combination(s). In addition, features from different embodiments described above could be selectively combined into a new embodiment. Accordingly, the invention is intended to embrace all such alternatives, modifications and variances which fall within the scope of the appended claims.

What is claimed is:

1. An apparatus comprising:
a portable electronic device; and
a carry strap connected to the portable electronic device, wherein the carry strap is configured to allow the portable electronic device to hang therefrom, wherein the carry strap comprises:
a flexible strap section configured to emit visible light, wherein the flexible strap section comprises a signal conductor; and
a signal connector connected to a first end of the signal conductor, wherein the signal connector is directly connected to the portable electronic device by a removable connection,
wherein a second end of the signal conductor is connected to circuitry of the portable electronic device, and wherein the signal conductor is configured to transmit signals between the signal connector and the circuitry,
wherein the apparatus comprises a system including an electronic controller configured to allow a user to customize different emissions of visible light from the flexible strap section based upon predetermined different events.

2. An apparatus as in claim 1 wherein the portable electronic device comprises a transceiver, and wherein the controller is configured to cause the flexible strap section to emit the visible light based upon occurrence of an incoming telephone call, or an incoming Short Message Service (SMS), or an incoming text message, or an incoming instant message, or a missed telephone call, or a predetermined data transmission event to or from the portable electronic device.

3. An apparatus as in claim 2 wherein the controller is configured to allow different colors, or light intensities, or patterns of illumination to occur at the flexible strap section.

4. An equipment comprising:
a portable electronic device; and
an apparatus connected to the portable electronic device, wherein said apparatus comprises:
a flexible strap section configured to emit visible light; and
a connection section configured to connect the flexible strap section to the portable electronic device such that the portable electronic device can hang from the flexible strap section,
wherein the connection section is configured to receive a signal from the portable electronic device, and the flexible strap section is configured to emit the visible light based, at least partially, upon the signal from the portable electronic device,
where the flexible strap section comprises an electrical conductor connected to an electrical connector at a first end of the flexible strap section, where the electrical connector is adapted to removably connect the electrical conductor to another device,
wherein the portable electronic device comprises a system including an electronic controller configured to allow a user to customize different emissions of visible light from the flexible strap based upon at least two predetermined different events, where the equipment is configured to provide a different, user customized, emission of visible light for each respective one of the at least two predetermined different events.

5. An equipment as in claim 4 wherein the flexible strap section comprises a longitudinal flexible light guide.

6. An equipment as in claim 5 wherein the signal is an optical signal and the connection section comprises an input into the flexible light guide.

7. An equipment as in claim 5 wherein the flexible strap section comprises a substantially transparent flexible tube around the light guide.

8. An equipment as in claim 5 wherein the connection section comprises a Light Emitting Diode (LED) configured to emit the visible light into the light guide, and wherein the signal is an electrical signal provided to the Light Emitting Diode (LED).

9. An equipment as in claim 4 wherein the flexible strap section comprises a linear array of Light Emitting Diodes (LEDs).

10. An equipment as in claim 4 wherein the connection section is located at a second end of the flexible strap section.

11. An equipment as in claim 4 wherein the electrical connector comprises a Universal Serial Bus (USB) electrical connector.

12. An equipment as in claim 4 wherein the flexible strap section comprises luminescent material.

13. An equipment as in claim 12 wherein the connection section comprises a first section configured to user detachably connect the first end of the flexible strap section to the portable electronic device, and an opposite second section configured to fixedly connect a second end of the flexible strap section to the portable electronic device.

14. An equipment as in claim 4 wherein the portable electronic device comprises a general loop shaped groove adapted to have the flexible strap section removably located therein along a substantially entire length of the flexible strap section.

15. An equipment as in claim 14 wherein the portable electronic device comprises a transceiver and a controller, and wherein the controller is configured to cause the flexible strap section to emit the visible light based upon occurrence of an incoming telephone call, or an incoming Short Message Service (SMS), or an incoming text message, or an incoming instant message, or a missed telephone call, or a predetermined data transmission event to or from the portable electronic device.

16. An equipment as in claim 15 wherein the controller is configured to allow different colors, or light intensities, or patterns of illumination to occur at the flexible strap section for different predetermined events.

17. An apparatus comprising:
a portable electronic device; and
a carry strap connected to the portable electronic device, wherein the carry strap is configured to allow the portable electronic device to hang therefrom, wherein the carry strap comprises a flexible strap section configured to emit visible light,
where the portable electronic device comprises a system, including an electronic controller, configured to allow a user to customize automatic different emissions of visible light from the flexible strap based upon predetermined different events, where the equipment is configured to provide a plurality of user customized different emissions of visible light for respective ones of the predetermined different events.

* * * * *

UNITED STATES PATENT AND TRADEMARK OFFICE
CERTIFICATE OF CORRECTION

PATENT NO. : 9,047,744 B2  
APPLICATION NO. : 12/722724  
DATED : June 2, 2015  
INVENTOR(S) : Teppo Tapani Jokinen Page 1 of 1

It is certified that error appears in the above-identified patent and that said Letters Patent is hereby corrected as shown below:

In the claims
In Claim 17, column 10, line 61, "the equipment" should be deleted and -- the apparatus -- should be inserted.

Signed and Sealed this
Twenty-fourth Day of November, 2015

Michelle K. Lee
*Director of the United States Patent and Trademark Office*